(12) United States Patent
Xue et al.

(10) Patent No.: US 8,855,125 B2
(45) Date of Patent: Oct. 7, 2014

(54) HANDLING OF NRS AND BCM IN PCRF AND GW

(71) Applicants: Xiong Xue, Ottawa (CA); Shanawaz Shaik, Ottawa (CA); Steve Rock, Ottawa (CA); Harinath Rachapalli, Naperville, IL (US)

(72) Inventors: Xiong Xue, Ottawa (CA); Shanawaz Shaik, Ottawa (CA); Steve Rock, Ottawa (CA); Harinath Rachapalli, Naperville, IL (US)

(73) Assignee: Alcatel Lucent, Boulogne-Billancourt (FR)

( * ) Notice: Subject to any disclaimer, the term of this patent is extended or adjusted under 35 U.S.C. 154(b) by 106 days.

(21) Appl. No.: 13/721,920

(22) Filed: Dec. 20, 2012

(65) Prior Publication Data

US 2014/0177533 A1      Jun. 26, 2014

(51) Int. Cl.
*H04L 12/28* (2006.01)
*H04W 72/04* (2009.01)

(52) U.S. Cl.
CPC .................... *H04W 72/0406* (2013.01)
USPC ............ 370/401; 370/252; 370/235; 370/254

(58) Field of Classification Search
None
See application file for complete search history.

(56) References Cited

U.S. PATENT DOCUMENTS

| | | | | |
|---|---|---|---|---|
| 8,477,621 | B2 * | 7/2013 | Janakiraman et al. | 370/235 |
| 2011/0292885 | A1 * | 12/2011 | Cuervo et al. | 370/329 |
| 2011/0320584 | A1 * | 12/2011 | Siddam et al. | 709/224 |

OTHER PUBLICATIONS

3GPP TS 29.212 V10.5.0 (Dec. 2011) 3rd Generation Partnership Project; Technical Specification Group Core Network and Terminals; Policy and Charging Control (PCC) over Gx reference point (Release 10), Internet—http://www.3gpp.org.

* cited by examiner

*Primary Examiner* — Duc C Ho
(74) *Attorney, Agent, or Firm* — Kramer Amado P.C.

(57) ABSTRACT

A method, apparatus, and machine readable storage medium is disclosed for handling Network-Request-Support (NRS) and Bearer Control Mode (BCM) at a Policy and Charging Rules Node (PCRN) and a Evolved Packet Core (EPC) gateway node. Embodiments maintain corresponding buffers for NRS values at the PCRN and the gateway and maintain synchronization between them. A gateway sends a credit control request (CCR) message to a PCRN and updates a local NRS buffer at the gateway when a successful credit control acknowledgement (CCA) response is received from the PCRN. Similarly, the PCRN updates a local NRS buffer at the PCRN when a successful credit control acknowledgement (CCA) response is sent to the gateway.

20 Claims, 4 Drawing Sheets

300A

| Use case | Use case description | NRS-req | NRS-gw | NRS-pcrf | BCM-policy | BCM-remove | BCM-pcrf | BCM-cca |
|---|---|---|---|---|---|---|---|---|
| 1 | Default NRS IP-CAN session establishment | absent | null | null | absent | absent | 0 | 0 |
| 2 | BCM overrides NRS a) IP-CAN establishment | 1 | null -> 1 | null -> 1 | 0 | absent | 0 | 0 |
|  | b) IP-CAN modification | absent | 1 | 1 | absent | absent | 2 | 2 |
| 3 | Session update failure discards requesting NRS a) IP-CAN establishment | 1 | null -> 1 | null ->1 | absent | absent | 2 | 2 |
|  | b) IP-CAN modification failed | 0 | 1 | 1 | absent | absent | 2 | absent |
|  | c) IP-CAN modification again | absent | 1 | 1 | absent | absent | 2 | absent |
| 4 | Session establishment failure discard input NRS a) session establishment failed | 1 | null | null | any | any | n/a | absent |
|  | b) session establishment again | absent | null | null | absent | absent | 0 | 0 |
| 5 | NRS is cached at session level a) session #1 establishment | 1 | null -> 1 | null -> 1 | absent | absent | 2 | 2 |
|  | b) session #2 establishment | absent | null | null | absent | absent | 0 | 0 |

FIG. 3A

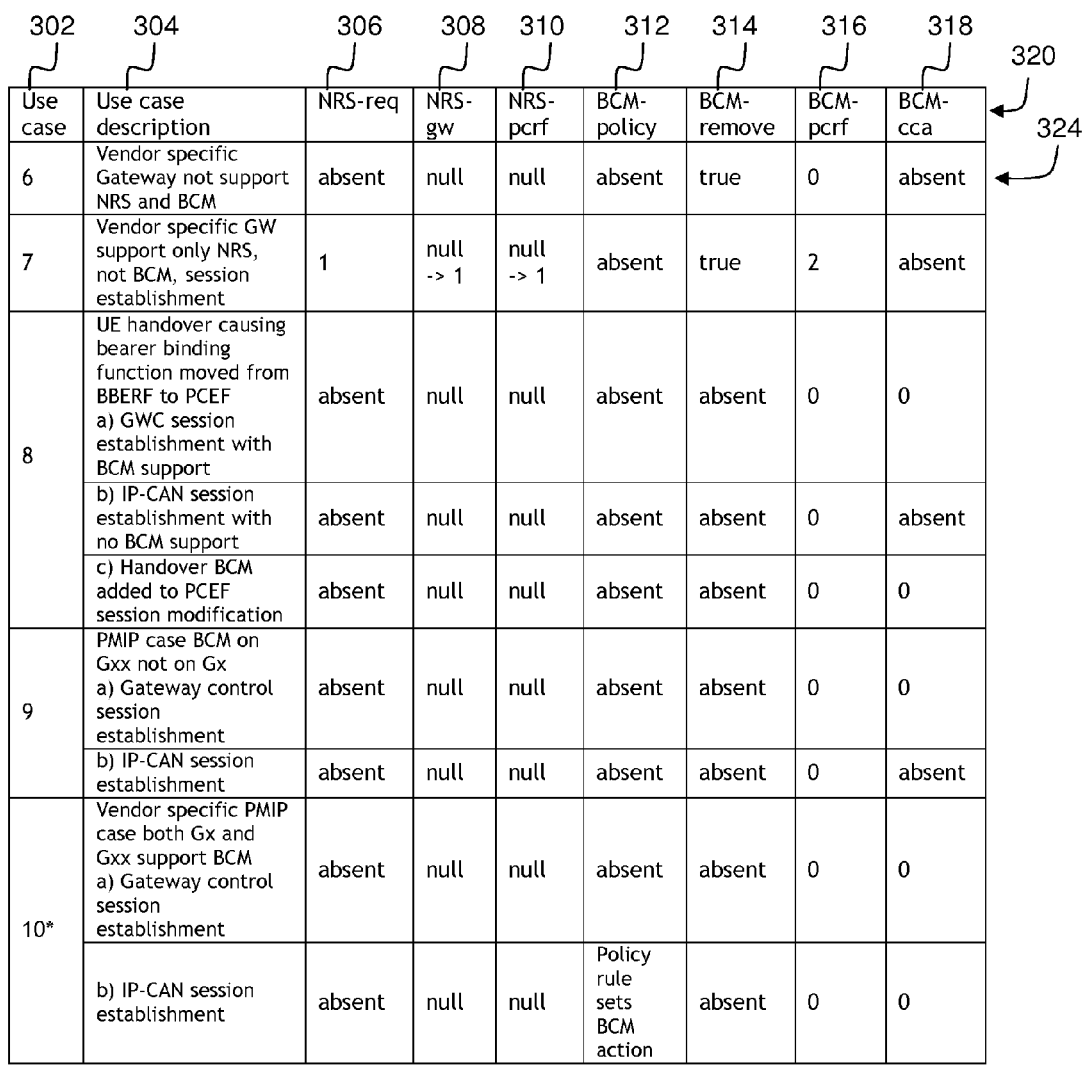

| Use case | Use case description | NRS-req | NRS-gw | NRS-pcrf | BCM-policy | BCM-remove | BCM-pcrf | BCM-cca |
|---|---|---|---|---|---|---|---|---|
| 6 | Vendor specific Gateway not support NRS and BCM | absent | null | null | absent | true | 0 | absent |
| 7 | Vendor specific GW support only NRS, not BCM, session establishment | 1 | null -> 1 | null -> 1 | absent | true | 2 | absent |
| 8 | UE handover causing bearer binding function moved from BBERF to PCEF a) GWC session establishment with BCM support | absent | null | null | absent | absent | 0 | 0 |
|  | b) IP-CAN session establishment with no BCM support | absent | null | null | absent | absent | 0 | absent |
|  | c) Handover BCM added to PCEF session modification | absent | null | null | absent | absent | 0 | 0 |
| 9 | PMIP case BCM on Gxx not on Gx a) Gateway control session establishment | absent | null | null | absent | absent | 0 | 0 |
|  | b) IP-CAN session establishment | absent | null | null | absent | absent | 0 | absent |
| 10* | Vendor specific PMIP case both Gx and Gxx support BCM a) Gateway control session establishment | absent | null | null | absent | absent | 0 | 0 |
|  | b) IP-CAN session establishment | absent | null | null | Policy rule sets BCM action | absent | 0 | 0 |

HANDLING OF NRS AND BCM IN PCRF AND GW

FIELD OF INVENTION

Various exemplary embodiments disclosed herein relate generally to policy and charging in telecommunications networks.

BACKGROUND

Bearer Control Mode (BCM) in a 3rd Generation Partnership Project (3GPP) mobile network Internet Protocol Connectivity Access Network (IP-CAN) session (or Gateway Control session) defines if it accepts network-initiated bearer establishment or modification. The 3GPP standard (specifically TS 29.212) states that the Bearer-Control-Mode AVP should be decided based on the Network-Request-Support (NRS) AVP in the Credit Control Request (CCR) message and the operator's policies defined in Policy Control and Charging Rules Function (PCRF) node.

However, the 3GPP specifications do not address certain scenarios, but which must to be addressed in real-world networks: such as how to handle a stored NRS value in a case where an operator's policy overrides BCM determination; how to handle a stored NRS value in a case of a failed message exchange; and how a PCRN should interact with PDN gateways which are non-standard, or do not support NRS and/or BCM.

In view of the foregoing, it would be desirable to provide a Policy and Charging Rules Node (PCRN) implementing a PCRF capable of handling some or all of the above scenarios.

SUMMARY

A brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method performed by a policy and charging rules node (PCRN). The method comprises: receiving at the PCRN, a service request message from an Evolved Packet Core (EPC) node; generating a response message to the service request message; and if the response message is a success message; determining whether the service request message includes a Network-Request-Support (NRS) attribute value pair (AVP) for an Internet Protocol Connectivity Access Network (IP-CAN) session or a gateway control session; and if the service request message includes the NRS AVP: storing the NRS value in a NRS buffer at the PCRN; determining a Bearer Control Mode (BCM) value for the IP-CAN session, based on the NRS value and policy rules at the PCRN; storing the BCM value in a BCM buffer at the PCRN; and sending the response message containing a BCM AVP containing the BCM value for the IP-CAN session or gateway control session.

In various alternative embodiments, the service request message comprises a Credit Control Request (CCR) message; and the response message comprises a Credit Control Answer (CCA) message.

In various alternative embodiments, if a value of a BCM-remove flag associated with the EPC node, stored at the PCRN, is true then sending the CCA message with no BCM AVP.

Various alternative embodiments, further comprise steps of: if the CCA message is a fail message then; not storing the NRS value in the NRS buffer at the PCRN; not storing the BCM value in a BCM buffer at the PCRN; and sending the CCA message with no BCM AVP.

Various other exemplary embodiments relate to a tangible and non-transitory machine-readable storage medium encoded with instructions thereon for execution by a policy and charging rules node (PCRN), wherein the tangible and non-transitory machine-readable storage medium comprises instructions for: receiving at the PCRN, a service request message from an Evolved Packet Core node; generating a response message; and if the response message is a success message; determining whether the service request message includes a Network-Request-Support (NRS) attribute value pair (AVP) for an Internet Protocol Connectivity Access Network (IP-CAN) session or a gateway control session; and if the service request message includes the NRS AVP: storing the NRS value in a NRS buffer at the PCRN; determining a Bearer Control Mode (BCM) value for the IP-CAN session or gateway control session, based on the NRS value and policy rules at the PCRN; storing the BCM value in a BCM buffer at the PCRN; and sending the response message containing a BCM AVP containing the BCM value for the IP-CAN session or gateway control session.

Various other exemplary embodiments relate to a policy and charging rules node (PCRN) for handling an incoming request message. The PCRN comprises: an interface for communicating with an Evolved Packet Core (EPC) node; a Network-Request-Support (NRS) buffer; a Bearer Control Mode (BCM) buffer; wherein the PCRN is configured to: receive a service request message on the interface from the EPC node; generate a response message to the request message; and if the response message is a success message; determine whether the request message includes a Network-Request-Support (NRS) attribute value pair (AVP) for an Internet Protocol Connectivity Access Network (IP-CAN) session or gateway control session; and if the request message includes the NRS AVP: store the NRS value in the NRS buffer; determine a Bearer Control Mode (BCM) value for the IP-CAN session, based on the NRS value and policy rules at the PCRN; store the BCM value in the BCM buffer; and send the response message containing a BCM AVP containing the BCM value for the IP-CAN session or gateway control session on the interface to the EPC node.

Various alternative embodiments further comprise a BCM-remove flag buffer associated with the EPC node, wherein if the BCM-remove flag is true, then the PCRN is further configured to send the CCA message with no BCM AVP.

In various alternative embodiments, if the CCA message is a fail message then the PCRN is further configured to: not store the NRS value in the NRS buffer; not store the BCM value in the BCM buffer; and send the CCA message with no BCM AVP.

Various other exemplary embodiments relate to a method performed by an Evolved Packet Core (EPC) gateway node. The method comprises: sending a service request message for an Internet Protocol Connectivity Access Network (IP-CAN) session or gateway control session to a policy and charging rules node (PCRN), the service request message including a Network-Request-Support (NRS) attribute value pair (AVP) containing an NRS value; receiving a response message from the PCRN in response to the service request message, determining if the response message is a success message; and storing the NRS value in a buffer at the EPC gateway node only if the response message is a success message.

In various alternative embodiments the sending step is preceded by a step of determining if the received NRS value is different from a NRS value stored in said NRS buffer and wherein the service request message only includes the NRS AVP containing the received NRS value if the received NRS value is different from a NRS value stored in the NRS buffer.

Various other exemplary embodiments relate to a tangible and non-transitory machine-readable storage medium encoded with instructions thereon for execution by an Evolved Packet Core (EPC) gateway node), wherein the tangible and non-transitory machine-readable storage medium comprises instructions for: receiving a NRS value from a downstream node; sending a service request message for an Internet Protocol Connectivity Access Network (IP-CAN) session or gateway control session to a policy and charging rules node (PCRN), the service request message including a Network-Request-Support (NRS) attribute value pair (AVP) containing the received NRS value; receiving a response message from the PCRN in response to the service request message, determining if the response message is a success message; and storing the received NRS value in a buffer at the EPC gateway node only if the response message is a success message.

Various other exemplary embodiments relate to an Evolved Packet Core (EPC) gateway node comprising: a first interface for communicating with a downstream node; a second interface for communicating with a policy and charging rules node (PCRN); a Network-Request-Support (NRS) buffer; wherein the EPC gateway node is configured to: send a service request message for an Internet Protocol Connectivity Access Network (IP-CAN) session or gateway control session to a policy and charging rules node (PCRN), the service request message including a Network-Request-Support (NRS) attribute value pair (AVP) containing an NRS value; receive a response message from the PCRN in response to the service request message, determine if the response message is a success message; and store the received NRS value in the NRS buffer at the EPC gateway node only if the response message is a success message.

In various alternative embodiments the EPC gateway node is further configured to determine if the received NRS value is different from a NRS value stored in the NRS buffer and wherein the service request message only includes the NRS AVP containing the received NRS value if the received NRS value is different from a NRS value stored in the NRS buffer.

BRIEF DESCRIPTION OF THE FIGURES

Some embodiments of apparatus and/or methods in accordance with embodiments of the present invention are now described, by way of example only, and with reference to the accompanying drawings in which:

FIGS. 3A, 3B illustrate a use case table for an embodiment; and

In the figures, like features are denoted by like reference characters.

DETAILED DESCRIPTION

Figure 1:
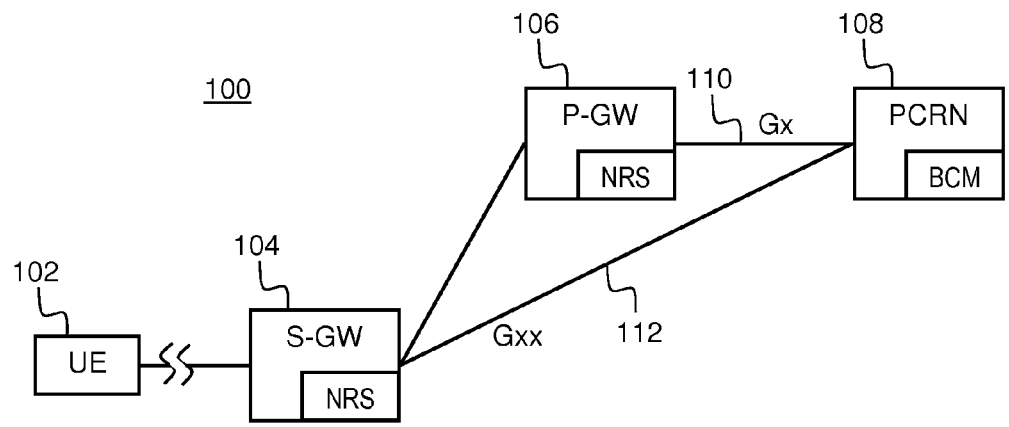
FIG. 1 illustrates an exemplary topology of an EPS-compatible network.

Referring now to the drawings, in which like numerals refer to like components or steps, there are disclosed broad aspects of various exemplary embodiments.

FIG. 1 illustrates an exemplary topology of an EPS-compatible telecommunications network 100. User Equipment (UE) 102 is connected through a radio access to S-GW node 104 which is connected to a P-GW node 106 and then through a Gx interface 110 to PCRN 108. S-GW node 104 can also connect through Gxx interface 112 to PCRN 108.

Figure 2:
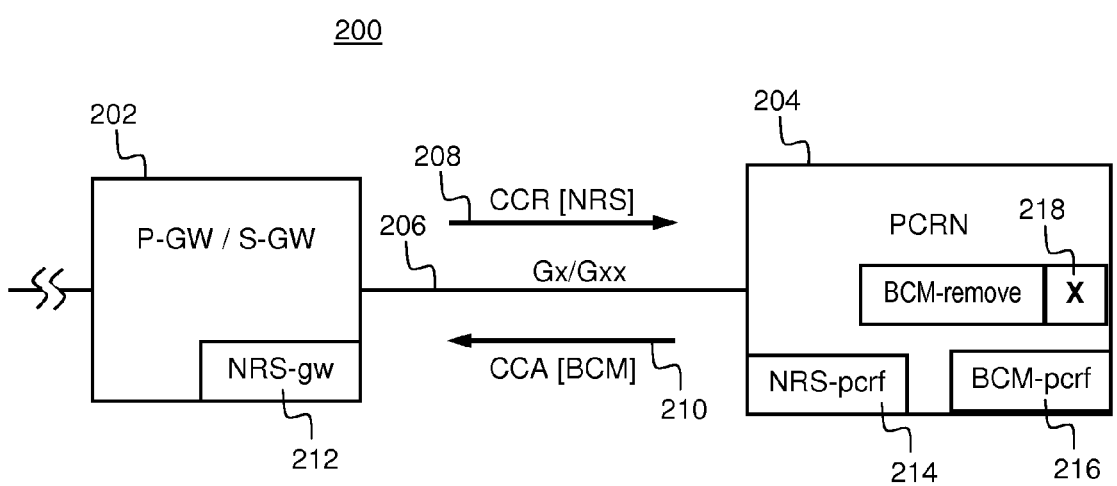
FIG. 2 illustrates a PCRN aspect and a communicating EPS node aspect of an embodiment.

In operation and with reference to FIG. 2, PCRN 204 communicates with EPC gateway node 202 (a P-GW or S-GW) via interface 206 (which can be a Gx interface in the case where EPC node 202 is a P-GW or can be a Gxx interface in the case where EPC node 202 is an S-GW).

EPC gateway node 202 implements a NRS buffer "NRS-gw" 212 to cache NRS values. PCRN 204 implements a NRS buffer "NRS-perf" 214 to cache NRS values in synchronization with the NRS-gw buffer 212. PCRN 204 also implements a BCM buffer "BCM-perf" 216 and a BCM-remove flag 218, as will be described below.

NRS-gw buffer 212 is empty (value=Null) on initialization of the EPC gateway node 202. On receipt of a NRS value from a downstream node, EPC gateway node 202 determines if the NRS value is different from the value stored in NRS-pw buffer 212, in which case EPC gateway node 202 sends a request message (such as CCR message 208) requesting a service such as an IP-CAN session establishment or modification request. Note that the NRS-pw buffer 212 is only updated after a success response to CCR message 208.

PCRN 204 receives the service request message 208 and proceeds to evaluate the request and starts to generate a response message such as a CCA message according to available resources and policies defined within the PCRN 204 as is well known in the art. As is known in the art, CCA can be a CCA-I message indicating a session establishment request, CCA can be a CCA-U message indicating a session modification request. If PCRN 204 determines that the response message is a success message, (i.e.: the request can be fulfilled and the CCA message status is "success") then PCRN 204 determines whether the request message includes a NRS AVP and if so, PCRN 204 stores the value of the received NRS (NRS value) in a NRS buffer 214 "NRS-perf". PCRN 204 then transmits the CCA response message 210 to the EPC gateway node 202 with a success status. EPC gateway node 202 receives the response message 210 and determines whether it has a success status and if so, then updates the NRS-gw buffer 212 with the current NRS value. In this manner, NRS-gw buffer 212 and NRS-perf buffer 214 maintain synchronization.

In the case where PCRN 204 returns a fail status in the response message 210 (e.g.: a CCA message), neither NRS-gw buffer 212 nor NRS-perf buffer 214 are updated with the current NRS value. In this manner, NRS-gw buffer 212 and NRS-perf buffer 214 continue to maintain synchronization.

In response to receiving the request message 208 the PCRN 204 also determines a value of a Bearer Control Mode (BCM) for the IP-CAN session or gateway control session associated with the request message 208, based on the received NRS value and on policy rules at the PCRN 204, as is known in the art. The BCM value is stored in BCM buffer "BCM-perf" 216 at the PCRN 204 and is keyed to the associated IP-CAN session or gateway control session. In the case where PCRN 204 returns a fail status in the response message 210 (e.g.: a CCA message), PCRN 204 will not update BCM buffer "BCM-perf" 216 and will not send a BCM AVP in the response message 210.

PCRN 204 additionally implements a BCM-remove flag 218, keyed to specific gateways or Gx or Gxx interfaces, to indicate that a BCM AVP should not be transmitted to the associated gateway or over the associated Gx/Gxx interface.

This is typically provisioned to indicate that the associated gateway cannot support BCM. This is valuable to allow interworking with non-standard-compliant gateways or other custom implementations. The value of the BCM-remove flag 218 can be populated via provisioning by the network operator and can be controlled dynamically via flexible rules at the PCRN 204. In operation, the BCM-remove flag overrides any determination by the PCRN 204 to send a BCM AVP in response messages 210.

FIGS. 3A, 3B show a use case table 300 to illustrate example scenarios to describe the behavior of embodiments of the invention. Header 320 of table 300 describes contents of the respective columns as follows. Column 302 provides a use case reference number for convenience of discussion. Column 304 provides a brief description of the use case.

Column 306 "NRS-req" represents the NRS value in session request CCR 208. Column 308 "NRS-gw" represents the value of the NRS in gateway buffer 212 (value is NULL when buffer is empty). Column 310 "NRS-perf" represents the value of the NRS in PCRF buffer 214 (value is NULL when buffer is empty). Column 312 "BCM-policy" represents the BCM value in PCRF operator policy rule action. This thus represents the BCM value as determined by PCRN 204 based on the policy rules within PCRN 204 and various inputs to the PCRN. Column 314 "BCM-remove" represents the value of the flag 218 indicating removal BCM from CCA response message (default value is false=do not remove). Column 316 "BCM-perf" represents the BCM value in PCRF internal IP-CAN session table 216. Column 318 "BCM-cca" represents the value of BCM in Gx/Gxx response message CCA 210.

Use case 1 illustrates the default NRS behavior. If NRS is absent in a CCR-I message 208, PCRN 204 would return BCM=0 in CCA-I 210 (unless there is a PCRN operator policy rule action to override it).

Use case 2 illustrates a case where determination of the BCM by PCRN 204 overrides the NRS value received at the PCRN 204. In the following event sequence: a) PCRN 204 receives a CCR-I message 208 (IP-CAN session establishment) containing a NRS AVP where NRS=1, PCRN 204 returns BCM=0in CCA-I message 210, due to PCRN operator policy rule override (rule action sets BCM=0); b) followed by PCRN 204 receiving a CCR-U message 208 (IP-CAN session modification), where NRS AVP is absent, PCRN 204 then uses the last NRS value (NRS=1) stored at NRS-perf 214, to determine that BCM=2 (provided no operator PDF rule in session update) and returns CCA-U message 210 with BCM AVP where BCM=1.

Use case 3 illustrates a case where an IP-CAN session update returns a failure response. In the following event sequence: a) PCRN 204 receives a CCR-I message 208 containing a NRS AVP where NRS=1, PCRF then returns CCA-I message 210 with BCM AVP where BCM=2; b) PCRN 204 then receives a first CCR-U message 208 where NRS=0, PCRN 204 then returns a first CCA-U message 210 with error code (i.e.: failed request), with no BCM AVP; c) PCRN 204 then receives a second CCR-U message 208 where NRS AVP is absent, PCRN 204 uses the last successful update (NRS=1), resulting in PCRN 204 determining that BCM=2. Since there is no change from the value stored at BCM-perf 216, PCRN 204 then returns a second CCA-U message 210 with no BCM AVP.

Use case 4 illustrates a case where session establishment failure causes the PCRN to discard received NRS. In the following event sequence: a) PCRN 204 receives a first CCR-I message 208 containing a NRS AVP where NRS=1, PCRN 204 returns a first CCA-I message 210 with error code, rejecting the request (i.e.: failed request), with no BCM AVP; b) PCRN 204 then receives a second CCR-I message 208 with no NRS AVP (NRS absent), PCRN 204 considers NRS=0 (default value) and then returns a second CCA-I message 210 with success code and with a BCM AVP where BCM=0.

Use case 5 illustrates a case where NRS is cached at an IP-CAN session level. In the following event sequence: a) PCRN 204 receives a first CCR-I message 208 for a first IP-CAN session ID, containing a NRS AVP where NRS=1, PCRN 204 returns a CCA-I message 210 for the first IP-CAN session ID with a BCM AVP where BCM=2; b) PCRN 204 then receives a second CCR-I message 208 for a second IP-CAN session ID, with no NRS AVP (NRS absent), PCRN 204 considers NRS=0 (default value) and then returns a second CCA-I message 210 for the second IP-CAN session ID, with a BCM AVP where BCM=0.

Use case 6 illustrates a case where a gateway does not support NRS and BCM. A PCRN 204 operator policy rule action defines BCM-remove flag 218=true in session establishment. This can be defined by the network operator by provisioning. In the following event sequence: PCRN 204 receives a first CCR message 208, with no NRS AVP. PCRN 204 determines a success response CCA message. Because there is no NRS value stored in the NRS-perf buffer 214, and there is no NRS value received in the CCR message 208, then NRS-perf buffer 214 is not updated and left as null, and BCM-perf buffer 216 is determined as zero. PCRN 204 sends response CCA message with no BCM AVP.

Use case 7 illustrates a case where a vendor-specific legacy gateway partially supports 3GPP specifications. (e.g.: a vendor-specific gateway (P-GW/GGSN) supports only NRS, but not BCM). A PCRN 204 operator policy rule action defines BCM-remove flag 218=true in session establishment. This can be defined by the network operator by provisioning. In the following event sequence: PCRN 204 receives a first CCR message 208, containing a NRS AVP where NRS=1. PCRN 204 determines that a success CCA message 210 is to be returned, and then updates the NRS value in NRS-perf buffer 214. BCM-perf 216 is also updated. PCRN 204 then sends response CCA message 210 but because the BCM-remove flag 218 is set, the BCM AVP is not included in the CCA message 210.

Use case 8 illustrates a case where a UE handover causing bearer binding function is moved from Bearer Binding and Event Reporting Function (BBERF) such as a Serving gateway (S-GW) 104 to Policy and Charging Enforcement Function (PCEF) such as P-GW 106 in session modification. In the following event sequence: a) PCRN 108 receives a CCR message containing no NRS AVP on interface Gxx 112 from S-GW 104 for a gateway control session establishment. PCRN 108 establishes the gateway control session with BCM support (BCM is determined as 0, when NRS takes default value 0). Thus PCRN 108 responds on interface Gxx 112 with a CCA message with BCM=0; b) PCRN 108 receives a CCR-I IP-CAN session establishment on Gx interface. PCRN 108 identifies that the network is in Proxy Mobile IP (PMIP) mode, BCM is not supported on Gx interface and P-GW, therefore, it is not included in CCA-I. c) UE moved to another location, now the access to the network is via GTP, e.g., a SGSN node, then to the P-GW 106. PCRN 108 receives a CCR-U message on interface Gx 110 from P-GW 106 for the same IP-CAN session, also with no NRS AVP. PCRN 108 detects that now the previous BBERF is no longer in the connection pass, therefore, P-GW 104 should resume bearer binding function. It responds with a CCA-U message on interface Gx 110, confirming the handover. In this case, CCA-U messages contains a BCM AVP with BCM=0.

Use case 9 illustrates a Proxy Mobile IPv6 (PMIPv6) case where BCM is only supported on a Gxx interface, not on Gx interface.

Use case 10 illustrates a case where vendor-specific gateways support BCM on both Gx and Gxx interfaces. Similarly to the use cases described above, PCRN can receive CCR session request messages with no NRS AVP and determine appropriate BCM values and transmission of BCM values in CCA response messages based on BCM-policies defined at the PCRN.

Figure 4:
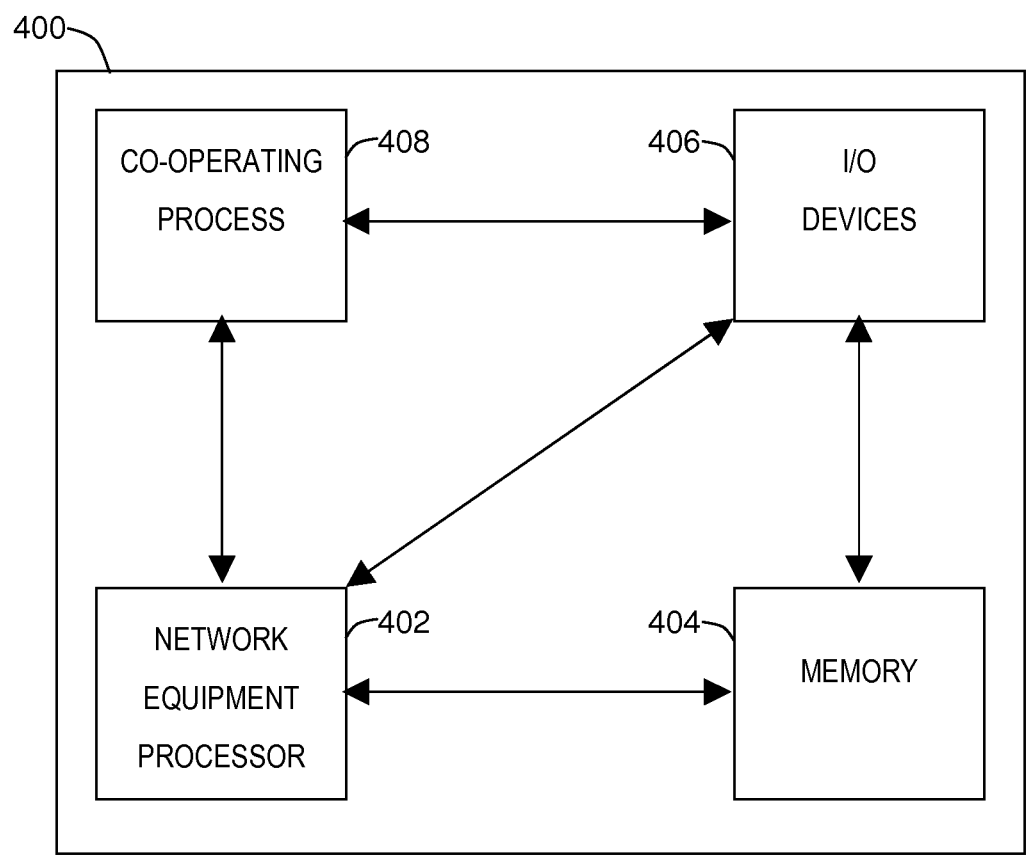
FIG. 4 illustrates an exemplary network element processor assembly according to an embodiment of the invention.

FIG. 4 depicts a high-level block diagram of a network equipment processor assembly suitable for use in performing functions described herein.

As depicted in FIG. 4, network equipment processor assembly 400 includes a network equipment processor element 402 (e.g., a central processing unit (CPU) and/or other suitable processor(s)), a memory 404 (e.g., random access memory (RAM), read only memory (ROM), and the like), a cooperating module/process 408, and various input/output devices 406 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 408 can be loaded into memory 404 and executed by network equipment processor 402 to implement the functions as discussed herein. As well, cooperating process 408 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention. Numerous modifications, variations and adaptations may be made to the embodiment of the invention described above without departing from the scope of the invention, which is defined in the claims.

What is claimed is:

1. A method performed by a policy and charging rules node (PCRN), the method comprising:
   receiving at said PCRN, a service request message from an Evolved Packet Core (EPC) node;
   generating a response message to said service request message; and if said response message is a success message;
  determining whether the service request message includes a Network-Request-Support (NRS) attribute value pair (AVP) for an Internet Protocol Connectivity Access Network (IP-CAN) session or a gateway control session; and
  if said service request message includes said NRS AVP:
    storing the NRS value in a NRS buffer at said PCRN;
    determining a Bearer Control Mode (BCM) value for the IP-CAN session, based on said NRS value and policy rules at said PCRN;
    storing said BCM value in a BCM buffer at said PCRN; and sending said response message containing a BCM AVP containing said BCM value for said IP-CAN session or gateway control session.

2. The method of claim 1, wherein said service request message comprises a Credit Control Request (CCR) message; and said response message comprises a Credit Control Answer (CCA) message.

3. The method of claim 2, wherein if a value of a BCM-remove flag associated with said EPC node, stored at said PCRN, is true then sending said CCA message with no BCM AVP.

4. The method of claim 2, further comprising steps of: if the CCA message is a fail message then;
  not storing said NRS value in said NRS buffer at said PCRN;
  not storing said BCM value in a BCM buffer at said PCRN; and
  sending said CCA message with no BCM AVP.

5. A tangible and non-transitory machine-readable storage medium encoded with instructions thereon for execution by a policy and charging rules node (PCRN), wherein the tangible and non-transitory machine-readable storage medium comprises instructions for:
  receiving at said PCRN, a service request message from an Evolved Packet Core node;
  generating a response message; and
  if said response message is a success message;
    determining whether the service request message includes a Network-Request-Support (NRS) attribute value pair (AVP) for an Internet Protocol Connectivity Access Network (IP-CAN) session or a gateway control session; and
    if said service request message includes said NRS AVP:
      storing the NRS value in a NRS buffer at said PCRN;
      determining a Bearer Control Mode (BCM) value for said IP-CAN session or gateway control session, based on said NRS value and policy rules at said PCRN;
      storing said BCM value in a BCM buffer at said PCRN; and sending said response message containing a BCM AVP containing said BCM value for said IP-CAN session or gateway control session.

6. The tangible and non-transitory machine-readable storage medium of claim 5, wherein said response message comprises a Credit Control Answer (CCA) message.

7. The tangible and non-transitory machine-readable storage medium of claim 6, further comprising instructions wherein if a BCM-remove flag associated with said EPC node, stored at said PCRN, is true then sending said CCA message with no BCM AVP.

8. The tangible and non-transitory machine-readable storage medium of claim 6, further comprising instructions wherein: if the CCA message is a fail message then;
  not storing said NRS value in said NRS buffer at said PCRN;
  not storing said BCM value in a BCM buffer at said PCRN; and
  sending said CCA message with no BCM AVP.

9. A policy and charging rules node (PCRN) for handling an incoming request message, said PCRN comprising:
  an interface for communicating with an Evolved Packet Core (EPC) node;
  a Network-Request-Support (NRS) buffer;
  a Bearer Control Mode (BCM) buffer;
  wherein said PCRN is configured to:
    receive a service request message on said interface from said EPC node;
    generate a response message to said request message; and if said response message is a success message;
    determining whether the request message includes a Network-Request-Support (NRS) attribute value pair (AVP) for an Internet Protocol Connectivity Access Network (IP-CAN) session or gateway control session; and
    if said request message includes said NRS AVP:
      store the NRS value in said NRS buffer;
      determine a Bearer Control Mode (BCM) value for said IP-CAN session or gateway control session, based on said NRS value and policy rules at said PCRN;
      store said BCM value in said BCM buffer; and
      send said response message containing a BCM AVP containing said BCM value for said IP-CAN session or gateway control session on said interface to said EPC node.

10. The PCRN of claim 9, wherein said request message comprises a Credit Control Request (CCR) message; and said response message comprises a Credit Control Answer (CCA) message.

11. The PCRN of claim 10, further comprising a BCM-remove flag buffer associated with said EPC node,
  wherein if the BCM-remove flag is true, then said PCRN is further configured to send said CCA message with no BCM AVP.

12. The PCRN of claim 10, wherein if said CCA message is a fail message then said PCRN is further configured to:
  not update said NRS value in said NRS buffer;
  not store said BCM value in said BCM buffer; and
  send said CCA message with no BCM AVP.

13. A method performed by an Evolved Packet Core (EPC) gateway node, the method comprising:
  receiving a NRS value from a downstream node;
  sending a service request message for an Internet Protocol Connectivity Access Network (IP-CAN) session or gateway control session, to a policy and charging rules node (PCRN), said service request message including a Network-Request-Support (NRS) attribute value pair (AVP) containing said received NRS value;
  receiving a response message from said PCRN in response to said service request message,
  determining if said response message is a success message; and
  storing said received NRS value in a NRS buffer at said EPC gateway node only if said response message is a success message.

14. The method of claim 13, wherein said sending step is preceded by a step of determining if said received NRS value is different from a NRS value stored in said NRS buffer and wherein said service request message only includes said NRS AVP containing said received NRS value if said received NRS value is different from a NRS value stored in said NRS buffer.

15. The method of claim 13, wherein said request message comprises a Credit Control Request (CCR) message; and said response message comprises a Credit Control Answer (CCA) message.

16. A tangible and non-transitory machine-readable storage medium encoded with instructions thereon for execution by an Evolved Packet Core (EPC) gateway node, wherein the tangible and non-transitory machine-readable storage medium comprises instructions for:
  receiving a NRS value from a downstream node;
  sending a service request message for an Internet Protocol Connectivity Access Network (IP-CAN) session or gateway control session, to a policy and charging rules node (PCRN), said service request message including a Network-Request-Support (NRS) attribute value pair (AVP) containing said received NRS value;
  receiving a response message from said PCRN in response to said service request message,
  determining if said response message is a success message; and
  storing said received NRS value in a NRS buffer at said EPC gateway node only if said response message is a success message.

17. The tangible and non-transitory machine-readable storage medium of claim 16, wherein said sending step is preceded by a step of determining if said received NRS value is different from a NRS value stored in said NRS buffer and wherein said service request message only includes said NRS AVP containing said received NRS value if said received NRS value is different from a NRS value stored in said NRS buffer.

18. The tangible and non-transitory machine-readable storage medium of claim 16, wherein said service request message comprises a Credit Control Request (CCR) message.

19. An Evolved Packet Core (EPC) gateway node comprising:
  a first interface for communicating with a downstream node;
  a second interface for communicating with a policy and charging rules node (PCRN);
  a Network-Request-Support (NRS) buffer;
  wherein said EPC gateway node is configured to:
    receive a NRS value from said downstream node;
    send a service request message for an Internet Protocol Connectivity Access Network (IP-CAN) session or gateway control session, to a policy and charging rules node (PCRN), said service request message including a Network-Request-Support (NRS) attribute value pair (AVP) containing said received NRS value;
    receive a response message from said PCRN in response to said service request message,
    determine if said response message is a success message; and
    store said received NRS value in said NRS buffer at said EPC gateway node only if said response message is a success message.

20. The EPC gateway node of claim 19, wherein said EPC gateway node is further configured to determine if said received NRS value is different from a NRS value stored in said NRS buffer and wherein said service request message only includes said NRS AVP containing said received NRS value if said received NRS value is different from a NRS value stored in said NRS buffer.

* * * * *